(12) United States Patent
Sekiguchi

(10) Patent No.: US 8,146,635 B2
(45) Date of Patent: Apr. 3, 2012

(54) PNEUMATIC TIRE

(75) Inventor: Takumi Sekiguchi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 347 days.

(21) Appl. No.: 12/443,765

(22) PCT Filed: Jul. 2, 2007

(86) PCT No.: PCT/JP2007/063215
§ 371 (c)(1),
(2), (4) Date: Mar. 31, 2009

(87) PCT Pub. No.: WO2008/059635
PCT Pub. Date: May 22, 2008

(65) Prior Publication Data
US 2010/0071821 A1  Mar. 25, 2010

(30) Foreign Application Priority Data
Nov. 17, 2006  (JP) .................. 2006-311202

(51) Int. Cl.
*B60C 19/12* (2006.01)
(52) U.S. Cl. ........................ 152/504; 152/204
(58) Field of Classification Search .............. 152/504
See application file for complete search history.

(56) References Cited

U.S. PATENT DOCUMENTS

| 2002/0036042 A1 | 3/2002 | Takeyama et al. |
| 2004/0194862 A1* | 10/2004 | Fukutomi et al. ............. 152/204 |
| 2004/0206438 A1 | 10/2004 | Takeyama et al. |

FOREIGN PATENT DOCUMENTS

| JP |   54027105 A  * | 3/1979 |
| JP |   A 54-27105 | 3/1979 |
| JP |   A 2002-362120 | 12/2002 |
| JP |   A 2003-80909 | 3/2003 |
| JP |   A 2003-118330 | 4/2003 |
| JP |   A 2006-231987 | 9/2006 |

OTHER PUBLICATIONS

Translation of JP 54-027105 A, Eiji Takiguchi et al.*

* cited by examiner

*Primary Examiner* — Katarzyna Wyrozebski Lee
*Assistant Examiner* — Daniel Lee
(74) *Attorney, Agent, or Firm* — Greer, Burns & Crain, Ltd.

(57) ABSTRACT

Disclosed is a pneumatic tire which has an enhanced uniformity of the tire including an adhesive sealant layer disposed inside its tread portion. In a pneumatic tire T including an adhesive sealant layer 5 disposed inward of an inner liner 4 in a region corresponding to its tread portion 1, the adhesive sealant layer 5 is formed of a laminate including: an auxiliary rubber layer 5a disposed closer to the inner liner 4, the compression set of the auxiliary rubber layer 5a being set at 40% or less; and an adhesive sealant material 5b disposed inward of the auxiliary rubber layer 5a.

4 Claims, 3 Drawing Sheets

US 8,146,635 B2

PNEUMATIC TIRE

This application is a U.S. National Phase under 35 U.S.C. §371 of International Application No. PCT/JP2007/063215, filed Jul. 2, 2007.

TECHNICAL FIELD

The present invention relates to a pneumatic tire, and specifically to a pneumatic tire including an adhesive sealant layer disposed inside its tread portion with an enhanced uniformity.

BACKGROUND ART

Various proposals have been made on a pneumatic tire which avoids a rapid decrease of its air pressure due to its puncture by disposing an adhesive sealant layer inside its tread portion for the purpose of securing safety for the vehicle in a case where the pneumatic tire runs over a nail while the vehicle is running.

An adhesive sealant is fluid. For this reason, if the adhesive sealant is exposed to the outside, a deflected flow occurs in the exposed adhesive sealant in the pneumatic tire while the pneumatic tire is in storage. In addition, the exposed adhesive sealant makes it difficult to mount the pneumatic tire onto a rim. With this taken into consideration, the surface of the adhesive sealant is usually covered with a cover rubber sheet for the purpose of avoiding these troubles.

When the pneumatic tire runs at high speed, the adhesive sealant flows and concentrates in the center area of the tire in the tire width direction due to the centrifugal force. In addition, the adhesive sealant is distributed unevenly in response to the tread portion's repeated change in shape on the contact side. The concentration and uneven distribution of the adhesive sealant reduces the tire's uniformity, and accordingly brings about problems including a problem that the reduced uniformity causes vibrations. Particularly in a case where the gauge thickness of the adhesive sealant layer is set larger for the purpose of securing the sealing effect, this phenomenon is conspicuously observed.

On the other hand, a proposal has been made on denaturation of an adhesive sealant layer into an adhesive and fluid sealant layer by using a rubber composition containing polyisobutylene rubber and peroxide for the adhesive sealant layer, disposing the rubber composition inside a tread portion of an uncured tire with the surface of the rubber composition being covered with a cover rubber sheet, and subsequently pyrolytically decomposing the rubber component with the peroxide by use of heat produced while the uncured tire is cured (see Patent Document 1, for example). Nevertheless, in the case of this type of tire, a large amount of cracked gas is produced while the rubber component is pyrolytically decomposed. For this reason, as shown in FIG. 5, the cracked gas G fills an interstice between the adhesive sealant layer 5 and the cover rubber sheet 6 so that the cover rubber seat 6 is distended. If the tire runs with the cover rubber sheet 6 distended by the cracked gas, the cover rubber sheet 6 blows out. This brings about a problem of further decreasing the uniformity of the tire.

Japanese Patent Application Kokai Publication No. 2003-80909

DISCLOSURE OF THE INVENTION

Problem to be Solved by the Invention

An object of the present invention is to solve the foregoing problems with the prior art. The present invention relates to a pneumatic tire with an enhanced uniformity of the tire including the adhesive sealant layer disposed inside the tread portion.

Means for Solving the Problem

A pneumatic tire according to the present invention made for the purpose of attaining the foregoing object is a pneumatic tire including an adhesive sealant layer disposed inward of an inner liner in a region corresponding to a tread portion, characterized in that the adhesive sealant layer is formed of a laminate including: an auxiliary rubber layer disposed closer to the inner liner, the compression set of the auxiliary rubber layer being 40% or less; and an adhesive sealant material disposed inward of the auxiliary rubber layer.

In addition, it is preferable that the pneumatic tire according to the present invention should be configured as described in the following points (1) to (4).

(1) The adhesive sealant material is made of a rubber component which is pyrolytically decomposed with peroxide, and the inward side of the adhesive sealant layer is covered with a cover rubber sheet.

(2) The thickness of the adhesive sealant layer is set at 3 mm to 6 mm, and the auxiliary rubber layer is designed to occupy 20% to 60% of the thickness of the adhesive sealant layer.

(3) The inner liner is formed in a way that the thickness of the inner liner is thicker in its area with which the adhesive sealant layer is in contact than in its other area.

(4) The break elongation of the auxiliary rubber layer is set at 700% or less. In addition, the 300% modulus of the auxiliary rubber layer is set at 13 MPa or less.

Effects of the Invention

According to the present invention, the adhesive sealant layer is formed of the laminate including: the auxiliary rubber layer disposed closer to the inner liner; and the adhesive sealant material disposed inward of the auxiliary rubber layer. For this reason, when a puncture hole occurs and penetrates the adhesive sealant layer as a result of incidents including the tire running over a nail, the auxiliary rubber layer disposed closer to the inner liner performs a function of sealing the puncture hole with its restoring force in conjunction with removal of the nail. This design makes it possible to reduce to the minimum the amount of the adhesive sealant material disposed to seal the puncture hole. Consequently, the reduction of the amount of adhesive sealant material makes the adhesive sealant material thinner in thickness. The thinner thickness of the adhesive sealant material increases the shearing force of the adhesive sealant material against the auxiliary rubber layer. Accordingly, the present invention is capable of suppressing the flow of the adhesive sealant material due to a centrifugal force applied to the pneumatic tire while the pneumatic tire is running, and hence capable of preventing the uniformity from being decreased.

In addition, in a case where the adhesive sealant material is formed of a rubber component which is pyrolytically decomposed with peroxide, the reduced amount of the adhesive sealant material decreases the amount of the cracked gas produced. For this reason, the present invention is capable of preventing the uniformity from being decreased due to a blowout of the cover rubber sheet.

EXPLANATION OF REFERENCE NUMERALS AND LETTERS

| | |
|---|---|
| 1 | tread portion |
| 2 | bead portion |
| 3 | sidewall portion |
| 4 | inner liner |
| 5 | adhesive sealant layer |
| 5a | auxiliary rubber layer |
| 5b | adhesive sealant material |
| 6 | cover rubber sheet |
| T | pneumatic tire |
| Z | gap |

BEST MODES FOR CARRYING OUT THE INVENTION

Detailed descriptions will be provided below for the structure of the present invention by referring to the attached drawings.

Figure 1:
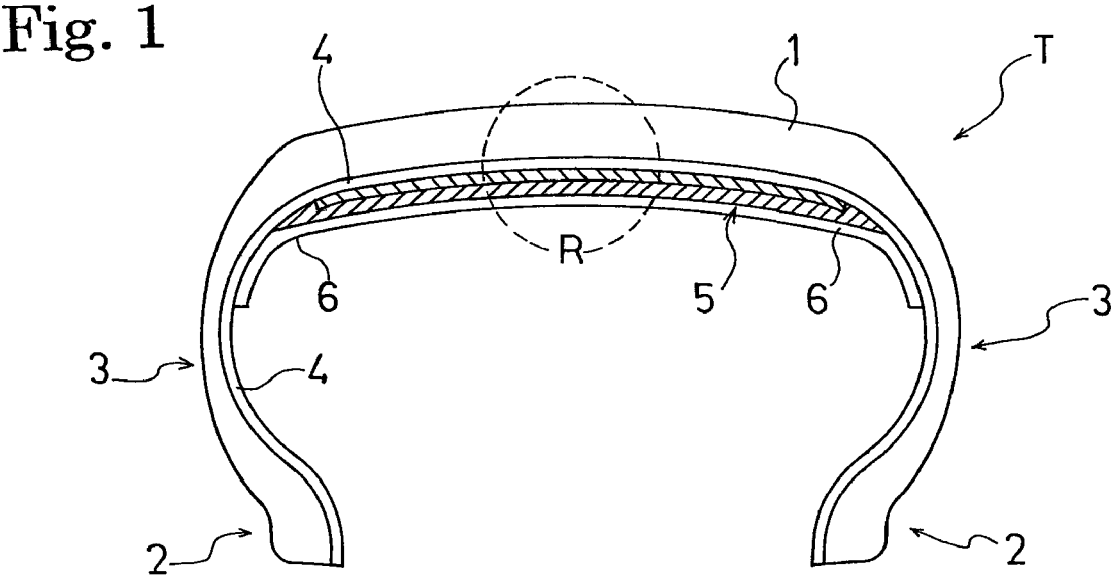
FIG. 1 is a cross-sectional view showing how a pneumatic tire according to an embodiment of the present invention looks before cured.
Figure 2:
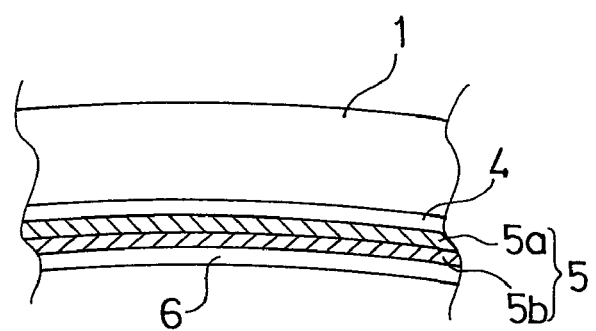
FIG. 2 is a magnified, cross-sectional view of a part of the pneumatic tire shown in FIG. 1, which is indicated by reference letter R.

FIG. 1 is a cross-sectional view showing how a pneumatic tire according to an embodiment of the present invention looks before cured. FIG. 2 is a magnified, cross-sectional view of a part of the pneumatic tire shown in FIG. 1, which is indicated by symbol R.

As shown in FIG. 1, a pneumatic tire T includes: a tread portion 1; paired left and right bead portions 2, 2; and sidewall portions 3, 3 connecting the tread portion 1 to the respective bead portions 2, 2. An adhesive sealant layer 5 is disposed inward of an inner liner 4 in a region corresponding to the tread portion 1. The inward side of the adhesive sealant layer 5 is covered with a cover rubber sheet 6. Note that, depending on the type and use purpose of the tire, the inward side of the adhesive sealant layer 5 may not be covered with the cover rubber sheet 6 in some cases.

As shown in FIG. 2 (the magnified view of the R part in FIG. 1), the adhesive sealant layer 5 is formed of a laminate including: an auxiliary rubber layer 5a disposed closer to the inner liner 4; and an adhesive sealant material 5b disposed inward of the auxiliary rubber layer 5a. A rubber with a compression set of 40% or less is used for the auxiliary rubber layer 5a. Preferably, a rubber with a compression set of 15 to 30% is used for the auxiliary rubber layer 5a.

Note that the compression set is defined as a value representing a piece of the auxiliary rubber layer 5a sampled from a post-cured tire, and subsequently shaped into an object with a diameter of 29.0 mm and with a thickness of 12.5 mm, as well as thereafter measured in accordance with JIS (Japanese Industrial Standards) K6262 under conditions: the temperature is 70° C.; the compression time is 24 hours; and the compression ratio is 25%.

By this, when a puncture hole occurs and penetrates the adhesive sealant layer 5 as a result of incidents including the tire running over a nail while the tire is running, the auxiliary rubber layer 5a disposed closer to the inner liner 4 performs a function of sealing the puncture hole with its restoring force in conjunction with removal of the nail. This design makes it possible to reduce to the minimum the amount of adhesive sealant material 5b disposed to seal the puncture hole. Consequently, the reduction of the amount of adhesive sealant material 5b makes the adhesive sealant material 5b thinner in thickness. The thinner thickness of the adhesive sealant material 5b increases the shearing force of the adhesive sealant material 5b against the auxiliary rubber layer 5a. Accordingly, the pneumatic tire according to the present embodiment is capable of restraining the adhesive sealant material 5b from becoming fluid due to a centrifugal force applied to the pneumatic tire while the pneumatic tire is running, and hence capable of preventing the uniformity from being decreased.

In the present invention, one or more rubbers selected from a group including natural rubber, isoprene rubber, butadiene rubber, butyl rubber and the like are used for the auxiliary rubber layer 5a. For the purpose of controlling the compression set of the auxiliary rubber layer 5a, compounding agents such as carbon black, zinc white, a curing accelerator and sulfur are added to these rubbers.

In the present invention, no specific restriction is imposed on the material for the adhesive sealant material 5b, as long as the adhesive sealant material 5b is adherent. From a viewpoint of securing workability and a better sealant material for the tire making, the adhesive sealant material 5b may be made of a rubber component which is pyrolytically decomposed with peroxide. In the case where the adhesive sealant material 5b is made of a rubber component which is pyrolytically decomposed with peroxide, as shown in FIG. 1, it is preferable that the inward side of the adhesive sealant layer 5 should be covered with the cover rubber sheet 6.

Figure 3:
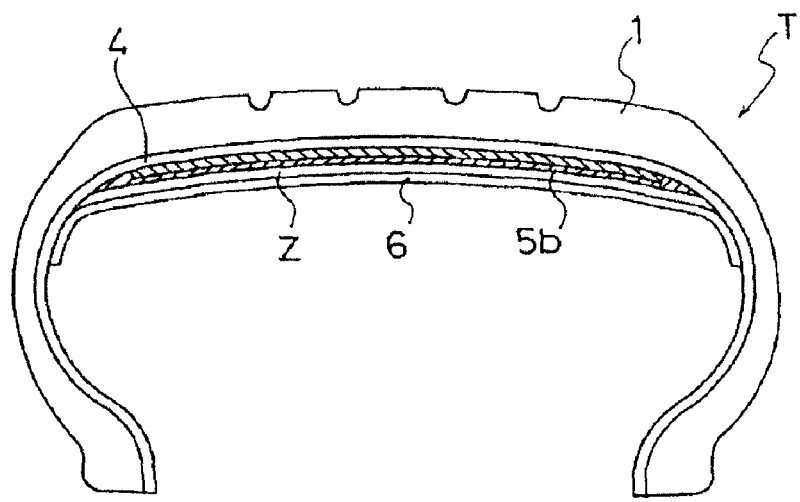
FIG. 3 is a cross-sectional view showing how the pneumatic tire shown in FIG. 1 looks after cured.

The pneumatic tire T thus structured is heated in a mold for a predetermined length of time. The heat decomposes the rubber component of which the adhesive sealant material 5b is made, and produces a gas. For this reason, as shown in FIG. 3, the cracked gas forms a slight gap Z between the adhesive sealant material 5b and the cover rubber sheet 6 in the pneumatic tire T after curing. The reduction of the amount of adhesive sealant material 5b reduces the gap formed by the cracked gas to the minimum in this manner. Consequently, the present embodiment is capable of preventing the cover rubber sheet 6 from blowing out, and of preventing the uniformity from decreasing.

For the adhesive sealant material 5b, polyisobutylene rubber, butyl rubber (IIR), isoprene rubber or the like is used as the rubber component which is pyrolytically decomposed with peroxide. Note that, for the purpose of controlling the viscosity of the adhesive sealant material 5b, in addition to the rubber component which is pyrolytically decomposed with peroxide, another rubber component may be blended into the rubber composition of which the adhesive sealant material 5b is made. Examples of this rubber component include styrene butadiene rubber, butadiene rubber and natural rubber.

Furthermore, in some cases, an additive may be added to the rubber component of which the adhesive sealant material 5b is formed depending on the necessity, for the purpose of accelerating the decomposition of the rubber component with peroxide. Examples of the additive includes: catalysts such as cobalt naphthenate; inorganic fillers such as carbon black and silica; adhesives such as polybutene; and plasticizers such as aromatic process oils, naphthenate process oils and paraffin process oils.

In the present invention, the thickness of the adhesive sealant layer 5 is preferably set at 3 to 6 mm, and the proportion of the thickness of the auxiliary rubber layer 5a to the thickness of the adhesive sealant layer 5 is preferably adjusted to 20 to 60%. When the proportion of the thickness of the auxiliary rubber layer 5a occupying the thickness of the adhesive sealant layer 5 is less than 20%, the thickness of the adhesive sealant material 5b is too thick. This makes it impossible to obtain the effect of enhancing the uniformity sufficiently. On the other hand, when the proportion of the thickness of the auxiliary rubber layer 5a occupying the thickness of the adhesive sealant layer 5 is more than 60%, the thickness of the adhesive sealant material 5b is too thin. This makes the sealing effect fall short.

Figure 4:
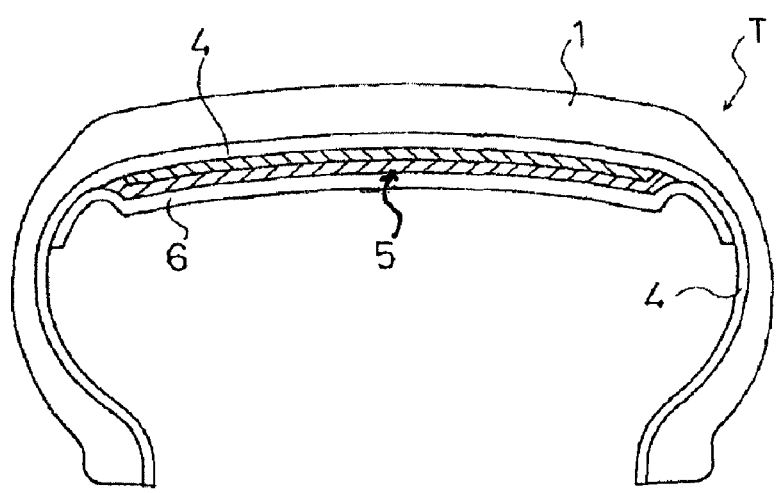
FIG. 4 is a cross-sectional view of a pneumatic tire according to another embodiment of the present invention, which corresponds to FIG. 1.
Figure 5:
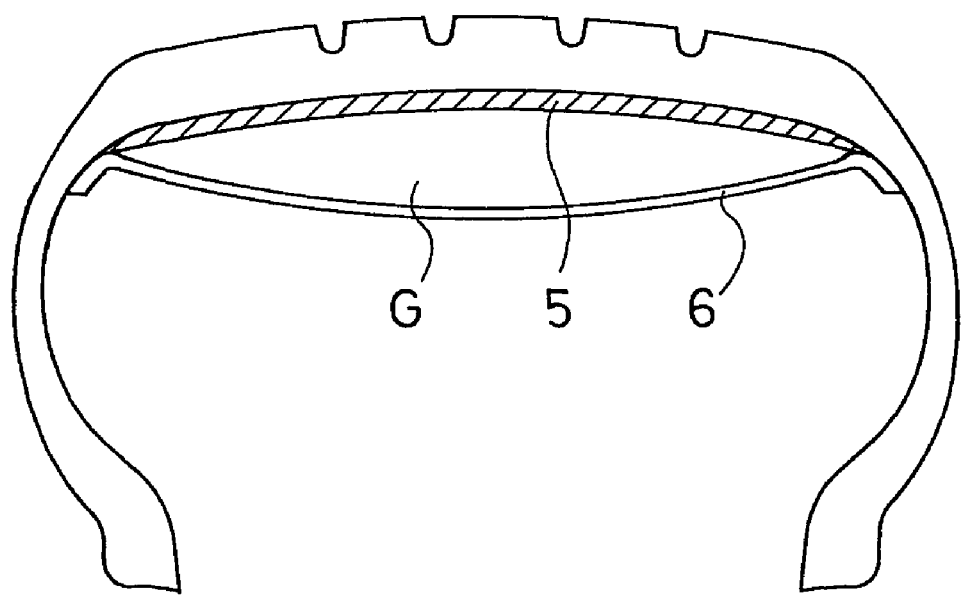
FIG. 5 is a cross-sectional view showing how a conventional type of pneumatic tire looks after cured.

It is more preferable that, as shown in FIG. 4, the inner liner 4 should be formed in a way that the thickness of the inner liner 4 is thicker in its area with which the adhesive sealant layer 5 is in contact than in its other area. No specific restriction is imposed on the thickness of the inner liner 4. It is preferable that the thickness of the inner liner 4 should be set in a range which does not allow the resultant increase in the weight of the tire to adversely affect the tire. Thereby, in addition to the restoring force which the rubber layer 5a exerts after a foreign object such as a nail is removed from the tire, the restoring force of the inner liner 4 is applied to the tire. Consequently, it is possible to obtain a more secure sealing effect.

As described above, the compression set of the rubber used for the auxiliary rubber layer 5a according to the present invention is preferably 40% or less, and more preferably 15% to 30%. In addition, the rubber used for the auxiliary rubber layer 5a preferably stretches 700% or less of its original length, and more preferably stretches 450% to 600% thereof, when the rubber starts to break. Thereby, the present invention is capable of offering a desired sealing effect, and concurrently capable of further decrease the amount of adhesive sealant material 5b which is used together with the auxiliary rubber layer 5a. Furthermore, for the purpose of securely obtaining the sealing effect, the 300% modulus of the auxiliary rubber layer 5a is adjusted preferably at 13 MPa or less, and more preferably at 5 MPa to 11 MPa.

In the pneumatic tire according to the present invention, as described above, the adhesive sealant layer disposed in the tread portion on the inner side is formed of a laminate including: the auxiliary rubber layer with a low compression set; and the adhesive sealant material. Thereby, the pneumatic tire according to the present invention aims at preventing the uniformity from decreasing whereas maintaining its sealing effect. The pneumatic tire according to the present invention brings about the excellent operational effect in spite of this simple configuration. For this reason, the present invention is preferably applied to pneumatic tires each including an adhesive sealant layer. Particularly in the case where the adhesive sealant material is made of the rubber component which is pyrolytically decomposed with peroxide, the present invention is preferably applied to any pneumatic tire with a maximum width of 225 mm or more and with a rim diameter of 16 inches or more. That is because a large amount of adhesive sealant layer needs to be disposed inside the tread portion for the purpose of securing the sealing effect for the pneumatic tire with a maximum width of 225 mm or more and with a rim diameter of 16 inches or more.

EXAMPLES

Conventional types of tires (conventional examples 1 and 2), tires according to the present invention (examples 1 and 2) and comparative tires (comparative example) were produced by making their tire sizes and the configurations of their adhesive sealant layers 5 different from one another as shown in Table 1. Note that the common overall configuration of the tires is as shown in FIG. 1, and that a rubber composition which is pyrolytically decomposed with peroxide was used for each of their adhesive sealant materials.

For each of these five tires, its sealing performance and uniformity were evaluated in accordance with the following test methods. Table 1 Shows results of their evaluation together with their tire sizes and the configurations of their adhesive sealant layers 5.

[Sealing Performance]

Each tire was mounted on a rim, and thereafter is inflated to an air pressure of 120 kPa. For each tire, subsequently, five nails each long enough to penetrate the tread portion were put into the tread portion. After that, each tire was left for one hour. Afterward, all the five nails were removed from each tire, and each resultant tire was left for 24 hours. For each tire, checks were made on how the internal pressure and the condition of the parts where the nails were put thereinto were changed after the 24 hours. On the basis of the check results, tires each with a satisfactory sealing performance are indicated by "Excellent," and a tire with an unsatisfactory sealing performance is indicated by "Poor."

[Uniformity]

After each tire was mounted onto a rim, the tire was inflated to an air pressure of 200 kPa. Thereafter, by use of a uniformity test machine, each resultant tire was caused to run at a running speed of 90 km/h for three hours, and the uniformity of each tire was measured. The result was classified into five evaluation values. A larger evaluation value means a better uniformity.

TABLE 1

| | | | CONVENTIONAL EXAMPLE 1 | CONVENTIONAL EXAMPLE 2 | EXAMPLE 1 | EXAMPLE 2 | COMPARATIVE EXAMPLE |
|---|---|---|---|---|---|---|---|
| TIRE SIZE | | | 205/65R15 | 235/40R18 | 235/40R18 | 235/40R18 | 235/40R18 |
| ADHESIVE SEALANT LAYER 5 | AUXILIARY RUBBER LAYER 5a | THICKNESS (mm) | — | — | 1.5 | 2.5 | 4.0 |
| | | COMPRESSION SET (%) | — | — | 25 | 25 | 25 |
| | THICKNESS OF ADHESIVE SEALANT MATERIAL 5b (mm) | | 5.0 | 5.0 | 3.5 | 2.5 | 1.0 |
| EVALUATION | SEALING PERFORMANCE | | Excellent | Excellent | Excellent | Excellent | Poor |
| | UNIFORMITY | | 3 | 2 | 4 | 5 | 5 |

From Table 1, it is learned that: with regard to the conventional types of tires, the uniformity is worse in conventional example 2 with the larger tire size than in conventional example 1; and each of the tires according to the present invention has a better uniformity than any one of the conventional types of tires while maintaining as good a sealing performance as any one of the conventional types of tire.

What is claimed is:

1. A pneumatic tire including an adhesive sealant layer disposed inward of an inner liner in a region corresponding to a tread portion, wherein the adhesive sealant layer is set at 3 mm to 6 mm, and is formed of a laminate including:
    an auxiliary rubber layer disposed closer to the inner liner and occupying 20% to 60% of the thickness of the adhesive sealant layer, the compression set of the auxiliary rubber layer being 40% or less; and
    an adhesive sealant material disposed inward of the auxiliary rubber layer; wherein the inner liner is formed in a way that the thickness of the inner liner is thicker in its area with which the adhesive sealant layer is in contact than in its other area.

2. The pneumatic tire according to claim 1, wherein
    the adhesive sealant material is made of a rubber component which is pyrolytically decomposed with peroxide, and
    the inward side of the adhesive sealant layer is covered with a cover rubber sheet.

3. The pneumatic tire according to any one of claims 1 and 2,
    wherein a break elongation of the auxiliary rubber layer is set at 450-600%.

4. The pneumatic tire according to claim 3, wherein the 300% modulus of the auxiliary rubber layer is set at 13 MPa or less.

* * * * *